Jan. 20, 1970    H. H. DOOLEY ET AL    3,491,246
PRESSURE TRANSDUCER VARYING POSITION OF RADIANT ENERGY
SOURCE IN ACCORDANCE WITH PRESSURE CHANGE
Filed Dec. 5, 1966

INVENTORS.
HARRY H. DOOLEY
ROBERT J. DODA
ARTHUR F. MAHON
BY Christie, Parker & Hale
ATTORNEYS.

United States Patent Office 3,491,246
Patented Jan. 20, 1970

3,491,246
PRESSURE TRANSDUCER VARYING POSITION OF RADIANT ENERGY SOURCE IN ACCORDANCE WITH PRESSURE CHANGE
Harry H. Dooley, Robert J. Doda, and Arthur F. Mahon, Tucson, Ariz., assignors to American Atomics Corporation, Tucson, Ariz., a corporation of Arizona
Filed Dec. 5, 1966, Ser. No. 599,025
Int. Cl. G01d 5/34
U.S. Cl. 250—231
2 Claims

ABSTRACT OF THE DISCLOSURE

A pressure transducer is disclosed in which a self-contained source of light is attached to a diaphragm that is displaced responsive to the pressure difference on its opposite surfaces. As the light source is displaced with the diaphragm, the light impinging upon a photoelectric cell varies. Thus, the photoelectric cell indicates the pressure difference. In one embodiment, a plurality of bellows connected in tandem is substituted for the diaphragm.

---

This invention relates to pressure-responsive devices, and more particularly, to a pressure transducer capable of operating accurately at low pressures.

Pressure transducers are widely used in industry for the purpose of indicating and recording pressure in measurement systems and for the purpose of transforming pressure into another parameter in control systems. These pressure transducers take many different forms whose modes of operation are based on a wide variety of scientific principles. Commonly, pressure is transformed into physical displacement of some object. Thus, the displaced object in a measurement system could be coupled to an indicator or another type of transducer by a mechanical linkage. The presently available pressure transducers experience difficulty in sensing small pressures accurately. A certain minimum pressure must be developed to overcome the effects of inertia and friction in the pressure transducer. The larger the mechanical linkage employed in the transducer, the larger these effects are and the less sensitive the transducer is to small pressures. Higher sensitivity can be derived from more elaborate mechanical linkage, but at greater cost and lower reliability.

According to the invention, a pressure transducer is provided having a radiation detector and a source of radiation spaced therefrom. The source is orientated so that a portion of its radiation is coupled to the detector. The coupled radiation is affected responsive to pressure, with the result that the detector serves to sense pressure.

Specifically, in one embodiment, the source is attached to a diaphragm, bellows, or other device that transforms pressure into a physical displacement. As the source is displaced responsive to pressure, the intensity of the radiation coupled to the detector also changes. No mechanical linkage is required to communicate between the source and the detector. Most advantageously, the source is self contained, i.e., the source of energy is contained within the source. Thus, no connecting wires need to be attached to the source. The pressure transducer is enclosed in a housing having three separate chambers. The diaphragm serves as the partition between two of the chambers. The source of radiation and the radiation detector are located in the third chamber. One end of a connecting rod is attached to the diaphragm and the other end extends into the third chamber where the radiation source is attached to it. Thus, one chamber contains the fluid whose pressure is to be detected, the other chamber contains a fluid at a reference pressure, and the third chamber, which is radiation-tight, contains the pressure indicating components.

In the preferred embodiment of the invention, the source radiates energy in the form of electromagnetic waves, for example, light energy. The intensity of electromagnetic energy varies as a function of the inverse square of the distance from the radiating source. This characteristic of electromagnetic energy is utilized to advantage by the invention to increase the sensitivity of a pressure transducer to low pressures. The source is arranged so it moves closer to a detector as the pressure increases. Because of the inverse square characteristic of electromagnetic waves, small pressure changes at low pressures produce large changes in the intensity of the radiation coupled to the detector.

According to a feature of the invention, the pressure-to-displacement transforming device can take the form of a plurality of bellows connected in tandem so their interiors form a single cavity. The resultant displacement occurring in response to pressure depends upon the individual characteristics of the bellows selected for the tandem arrangement.

These and other features of the invention are considered further in the following detailed description taken in conjunction with the drawings, in which.

Figure 1:
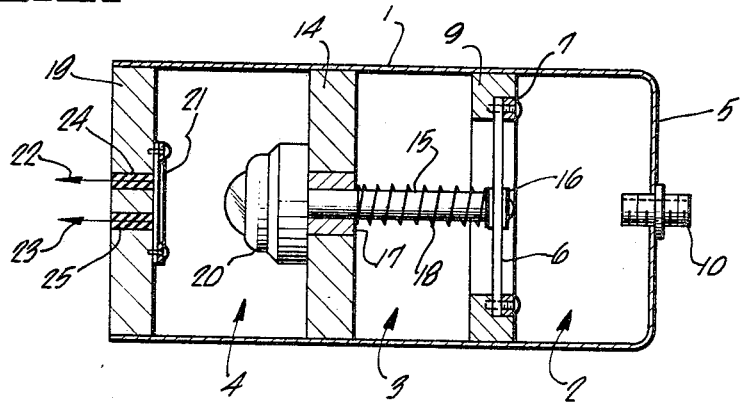
FIG. 1 is a side elevation view in section of a pressure transducer embodying the principles of the invention.

In FIG. 1 a cylindrical housing 1 is shown having within it chambers 2, 3, and 4. Chamber 2 is defined by the inside surface of housing 1, a circular end cap 5, and a diaphragm 6. Diaphragm 6 of deflectable material is mounted by screws between a retaining ring 7 and an annular block 9. A fluid, the pressure of which is to be detected, is fed into chamber 2 through a fitting 10. Chamber 2 is constructed so it is hermetically sealed. The pressure of any type of fluid could be detected regardless how corrosive by selection of surface coatings within chamber 2 designed to resist the particular fluid. In such case, the remainder of the pressure transducer would not be affected by the corrosiveness of the fluid whose pressure is to be detected since chamber 2 is sealed.

Chamber 3 is defined by the inside surface of housing 1, diaphragm 6, and a partition 14. A rod 15 is connected to diaphragm 6 at one end by a fastener 16. The other end of rod 15 extends through a bearing 17 mounted in partition 14. A compression spring 18 opposes axial movement of rod 15. Chamber 3 contains a fluid maintained at some reference pressure with respect to which the pressure transducer operates. If the reference pressure is to be, for example, atmospherical pressure, chamber 3 is not hermetically sealed so the pressure within it is the ambient pressure.

Chamber 4 is defined by the inside surface of housing 1, partition 14, and an end block 19 which covers the end of housing 1. A self-contained source 20 of light energy is attached to the end of rod 15 protruding into chamber 4. Source 20 could, for example, be of the same construction as the self-contained sources disclosed in a copending patent application of Theo F. Linhart, Jr., Robert J. Doda, and Arthur F. Mahon, entitled Self-Luminous Light Source, filed July 8, 1965, and assigned to the same assignee as the present application. In these sources light is produced by exciting a phosphor with a radioisotope. A photoelectric cell 21 is mounted on the surface of end block 19 in spaced relationship from source 20. Photoelectrical cell 21 is located with respect to source 20 such that a portion of the energy radiated by source 20 is coupled to it. Electrical leads 22 and 23 from photoelectric cell 21 pass through insulated fittings 24 and 25, respectively, in end block 19 and are connected to an ohmmeter or other electrical utilization device (not shown). Chamber 4 is light-tight so the light energy falling onto photoelectric cell 21 is exclusively attributable to source 20.

Many different radioisotopes can be employed to produce the light in source 20. If a radioisotope having a large half life such as carbon 14 is used, no correction for radioactive decay is necessary. For other radioisotopes, such as Krypton 85, a stationary light source and a corresponding photoelectric cell can be provided to serve as a reference to compensate for the decay of the radioisotope of source 20. By placing the two photoelectric cells in parallel, the effect of source 20 on the total resistance across leads 22 and 23 can be maintained substantially constant as the radioisotope decays.

In operation, diaphragm 6 is displaced responsive to the pressure difference between chambers 2 and 3. The extent of displacement for a given increase in pressure is regulated by selection of the characteristics of spring 18. The displacement of diaphragm 6 is coupled by rod 15 to source 20. As the pressure in chamber 2 rises with respect to the pressure in chamber 3, more light energy is coupled from source 20 to photoelectric cell 21. The resistance of photoelectric cell 21 decreases as the light intensity upon it increases.

Figure 2:
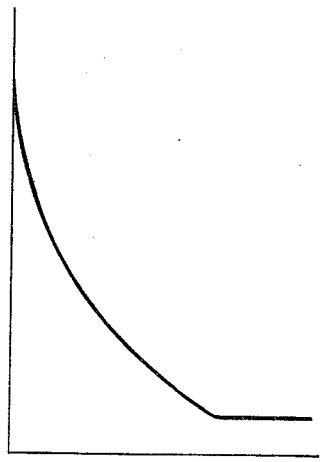
FIG. 2 is a graph representing the response of the pressure transducer of FIG. 1 pressure.

The displacement of source 20 as a function of the pressure difference between chambers 2 and 3 is essentially linear. The intensity of the light impinging upon photoelectric cell 21, however, varies as the inverse square of the distance between source 20 and photoelectric cell 21. Thus, at low pressures, a small change in pressure is accompanied by a relatively large change in the resistance of photoelectric cell 21. The relationship between the pressure difference in chambers 2 and 3 and the resistance of photoelectric cell 21 is represented by the graph in FIG. 2. The pressure increases from left to right along the abscissa in this graph and the resistance of photoelectric cell 21 increases from bottom to top along the ordinate. As represented in the graph of FIG. 2, the rate of change of the resistance of photoelectric cell 21 decreases as the pressure increases. Consequently, the pressure transducer is extremely sensitive at low pressures.

Instead of light source 20, sources of other types of radiation, such as gamma rays, infrared rays, beta particles, or ultrasonic waves could also be used. In each case, a compatible detector would be employed to intercept a portion of the radiation and a property of the radiation would be varied as a function of the pressure difference between chambers 2 and 3.

In place of diaphragm 6, a metal bellows of a commercially available type could be employed. These bellows are commonly made by electroplating a thin layer of a metal onto a solid cylindrical mandrel with annular grooves in it and dissolving out the mandrel, leaving a thin metal shell. The resulting bellows functions as a spring that can be expanded and contracted axially. In such case, one end of the bellows would be mounted between block 9 and retaining ring 7 (FIG. 1). This end would be open. The other end of the bellows, which would be covered by an end plate, would be displaced responsive to the pressure difference between the opposite surfaces of the end plate. Rod 15 would be attached to the end plate.

Figure 3:
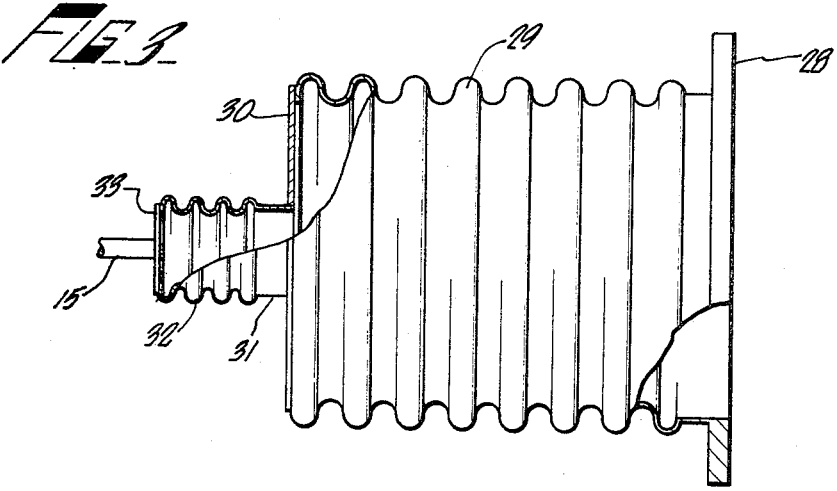
FIG. 3 is a side elevation view partially in section of a plurality of bellows connected in tandem in an alternate arrangement to the diaphragm of FIG. 1.

In FIG. 3, a plurality of bellows are shown connected in tandem. This tandem arrangement could also be used instead of diaphragm 6. A flange 28, which would be mounted between retaining ring 7 and block 9 in FIG. 1, is attached to one end of a large bellows 29. The end of bellows 29 to which flange 28 is attached is open. The free end of bellows 29 is covered by an end plate 30 that has an opening at its center. A tube 31 extends from the opening in plate 30. One end of a small bellows 32 is attached to tube 31. This end is open. The other end of bellows 32 is covered by an end plate 33. Rod 15 is fastened to end plate 33. The interior of bellows 29 and 32 is at the same pressure as chamber 2, and the exterior of bellows 29 and 32 is at the same pressure as chamber 3. The force exerted on end plates 33 and 30 due to the pressure difference between chambers 2 and 3 causes bellows 29 and 32, respectively, to expand or contract, which in turn displaces rod 15 axially. The resultant displacement of rod 15 as a function of pressure equals the sum of the individual displacements of bellows 29 and 32. By selection of individual bellows with specified characteristics, a wide range of different responses, linear as well as nonlinear, can be obtained as a function of pressure.

What is claimed is:
1. A pressure transducer unit comprising:
an elongated housing;
a first partition in said housing defining with one end of said housing a first chamber, said first partition comprising a large diameter bellows having an open end attached to said housing, and a small diameter bellows having an open end attached to the covered end of said first bellows, said first partition being movable responsive to pressure difference on its opposite sides;
a fitting in said housing forming a passage into said first chamber for admitting a fluid whose pressure is to be detected, said first chamber being hermetically sealed except for said passage;
a second partition in said housing defining with said first partition a second chamber and defining with the other end of said housing a third chamber, and having a bearing mounted therein;
a connecting rod having an end attached to the covered end of said second bellows and extending through said bearing into said third chamber, said third chamber being radiation-tight;
a source of radiation in said third chamber on the other end of the connecting rod and movable therewith; and
a radiation detector in said third chamber mounted in spaced relation to said radiation source to intercept radiated energy as determined by the position of said source;
said covered end of said first bellows having an opening therein to equalize pressure within said bellows.
2. The pressure transducer of claim 1, in which the second chamber is at the ambient pressure outside the housing.

References Cited
UNITED STATES PATENTS

| | | | |
|---|---|---|---|
| 2,111,855 | 3/1938 | Groh | 92—37 X |
| 2,768,261 | 10/1956 | Mathisen | 92—37 X |
| 2,910,593 | 10/1959 | Laing et al. | 250—77 |
| 2,932,203 | 4/1960 | Peters | 92—38 X |
| 2,933,607 | 4/1960 | Friedman. | |
| 2,945,376 | 7/1960 | Gehre | 92—37 X |
| 3,158,028 | 11/1964 | Chope. | |
| 3,173,004 | 3/1965 | McKenzie. | |
| 3,254,211 | 5/1966 | Black. | |

ROBERT SEGAL, Primary Examiner

U.S. Cl. X.R.

250—43.2, 83